(12) United States Patent
Terlingen et al.

(10) Patent No.: US 10,232,292 B2
(45) Date of Patent: Mar. 19, 2019

(54) METHOD AND APPARATUS FOR PLACEMENT OF A SUBTERRANEAN CURTAIN BELOW THE FACE OF THE EARTH

(71) Applicant: Van den Herik Sliedrecht, Sliedrecht (NL)

(72) Inventors: Jeroen Paulus Maria Terlingen, Sliedrecht (NL); Marinus Veldhoen, Sliedrecht (NL); Albertus Lenting, Sliedrecht (NL)

(73) Assignee: VAN DEN HERIK SLIEDRECHT, Sliedrecht (NL)

( * ) Notice: Subject to any disclaimer, the term of this patent is extended or adjusted under 35 U.S.C. 154(b) by 0 days.

(21) Appl. No.: 15/374,619

(22) Filed: Dec. 9, 2016

(65) Prior Publication Data

US 2017/0087489 A1    Mar. 30, 2017

Related U.S. Application Data

(63) Continuation of application No. PCT/NL2015/050424, filed on Jun. 11, 2015.

(30) Foreign Application Priority Data

Jun. 13, 2014  (NL) ..................... 2012998

(51) Int. Cl.
| | | |
|---|---|---|
| *E02D 19/12* | (2006.01) | |
| *B01D 35/06* | (2006.01) | |
| *E02D 17/20* | (2006.01) | |
| *E02F 5/06* | (2006.01) | |
| *E02F 5/10* | (2006.01) | |
| *E02F 5/12* | (2006.01) | |
| *E02F 5/14* | (2006.01) | |
| *E02F 7/06* | (2006.01) | |
| *B01D 35/143* | (2006.01) | |

(52) U.S. Cl.
CPC .......... *B01D 35/06* (2013.01); *B01D 35/143* (2013.01); *E02D 17/20* (2013.01); *E02D 17/202* (2013.01); *E02D 19/12* (2013.01); *E02F 5/06* (2013.01); *E02F 5/10* (2013.01); *E02F 5/101* (2013.01); *E02F 5/12* (2013.01); *E02F 5/14* (2013.01); *E02F 5/145* (2013.01); *E02F 7/06* (2013.01)

(58) Field of Classification Search
CPC . E02D 17/20; E02D 19/12; E02B 3/04; E02B 3/10; E02F 5/10; E02F 5/12
See application file for complete search history.

(56) References Cited

U.S. PATENT DOCUMENTS 3,603,099 A * 9/1971 Zakiewicz .............. E02D 5/187
37/355
4,607,981 A * 8/1986 Van Klinken ........... E02D 19/18
405/129.8

(Continued)

FOREIGN PATENT DOCUMENTS

DE    3735679    5/1989
EP    0191533    8/1986

(Continued)

*Primary Examiner* — Frederick L Lagman
(74) *Attorney, Agent, or Firm* — Peacock Law P.C.; Janeen Vilven; Camille Martinez

(57) ABSTRACT

Apparatus and method for placement of a subterranean curtain below the face of the earth.

6 Claims, 1 Drawing Sheet

(56) References Cited

U.S. PATENT DOCUMENTS

| | | | |
|---|---|---|---|
| 4,720,212 A * | 1/1988 | Steenbergen | E02D 19/18 405/176 |
| 4,830,537 A | 5/1989 | Munro et al. | |
| 4,863,312 A * | 9/1989 | Cavalli | B09B 1/00 299/11 |
| 4,871,281 A * | 10/1989 | Justice | E02F 3/10 37/353 |
| 4,877,358 A * | 10/1989 | Ressi di Cervia | E02D 5/18 405/129.6 |
| 4,929,126 A * | 5/1990 | Steenbergen | E02D 19/18 405/129.75 |
| 5,118,230 A | 6/1992 | Justice | |
| 5,246,312 A * | 9/1993 | Taki | E02D 19/18 405/129.75 |
| 5,573,347 A | 11/1996 | Miles et al. | |
| 5,663,490 A | 9/1997 | Kozen | |
| 5,685,668 A | 11/1997 | Justice | |
| 5,701,692 A * | 12/1997 | Woodall | E02F 5/06 37/142.5 |
| 5,915,878 A | 6/1999 | Carpenter | |
| 6,016,714 A | 1/2000 | Smith et al. | |
| 6,053,665 A * | 4/2000 | Richardson | E01F 7/04 256/12.5 |

FOREIGN PATENT DOCUMENTS

| | | |
|---|---|---|
| EP | 0277670 | 8/1988 |
| EP | 0585188 | 3/1994 |
| WO | 00/22245 | 4/2000 |
| WO | 2015/190924 | 12/2015 |

* cited by examiner

U.S. Patent
Mar. 19, 2019
US 10,232,292 B2
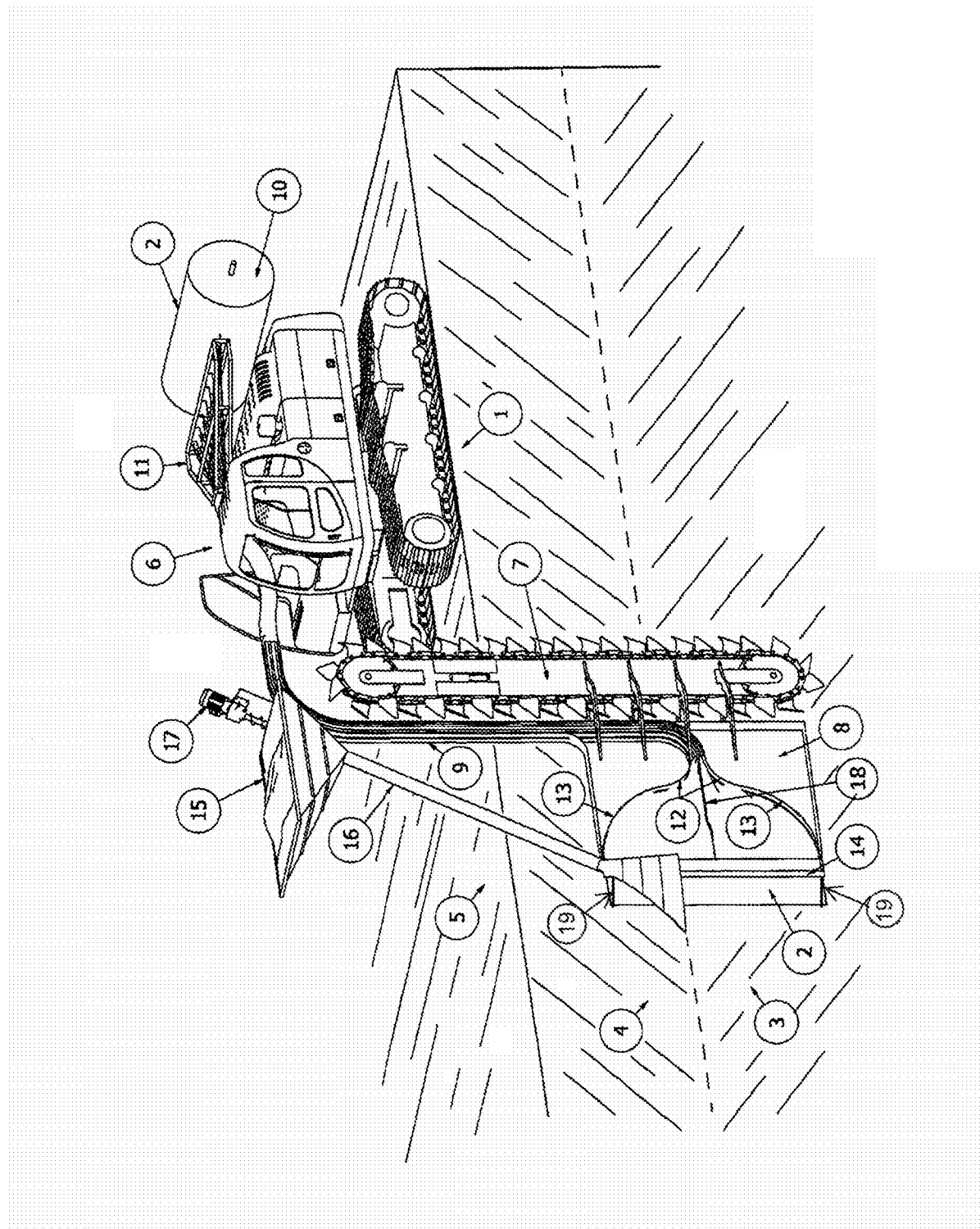

US 10,232,292 B2

METHOD AND APPARATUS FOR PLACEMENT OF A SUBTERRANEAN CURTAIN BELOW THE FACE OF THE EARTH

CROSS-REFERENCE TO RELATED APPLICATIONS

This application is a continuation application of Patent Cooperation Treaty Application No. PCT/NL2015/050024, filed on Jun. 11, 2015, which claims priority to Netherlands Patent Application No. 2012998, filed on Jun. 13, 2014, and the specifications and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a method for placement of a subterranean curtain below the face of the earth.

Description of Related Art Including Information Disclosed Under 37 C.F.R. §§ 1.97 and 1.98:

U.S. Pat. No. 5,118,230 discloses a trenching tool which digs a trench to depth of 6 to 30 feet (2 to 10 m). A liner carrier case is conveyed to the trench bottom from which is withdrawn an impermeable barrier liner which extends from the bottom to the top of the excavated trench. The impermeable liner is deployed simultaneously with the trenching operation. After placement of the liner the trench is backfilled with material previously dug from the trench.

U.S. Pat. No. 5,915,878 discloses a device for slicing through soil and simultaneously inserting a silt fence into the soil. The silt fence is a synthetic material installed in and above the ground to impede silt erosion from areas disturbed by a construction. The device thinly slices through the soil 8 to 12 inches deep (2.6 to 4 m). It includes a vertical wheel operating between two parallel panels, acting as a moving pivot point where the horizontal silt fence is converted to a vertical position between the panels. The panels hold the soil open while the vertical wheel simultaneously inserts the silt fence into the opening. As the machine progresses, soil collapses against the silt fence, thus securing the silt fence in the desired position.

U.S. Pat. No. 5,685,668 discloses an apparatus for delivering liner material into a trench, that provides continuous rolls of liner material which are joined by vertical and horizontal seams to accommodate the desired length or configuration of placement. To initiate unrolling of a length of liner material, a roll of material is dropped into the installation apparatus which trenches into the subsurface. One end of the liner material is held in place by restraints and hydraulic presses. The roll is then unrolled by trenching backwards, cutting a trench and unfurling the roll in the formed trench.

EP-A-0 191 533 discloses laying a sheet of material in the ground by digging a trench by means of a trench digger and unwinding a sheet of material from a stock roll above ground level, passing it into the trench in a downward direction and diverting it in a direction essentially parallel to ground level. The sheet of material is folded twice and passed down in the trench, and is passed further via three return rollers or rods or flanges in the unfolded state in an approximately vertical plane in the horizontal direction.

EP-A-0 277 670 discloses a method for installing a screen of flexible material in the soil, wherein a trench is dug in the soil and the screen is fed into the trench. The screen is provided by facilities to prevent its sagging into the still unfilled trench by providing a wire strung through the top edge of the screen which is held under a certain tension, and wherein a strip is applied which is bonded along the top edge of the screen or an inflatable sleeve fitted to the top edge of the screen. The screen may be provided as a sleeve fillable with gas, liquid or a substance.

BRIEF SUMMARY OF THE INVENTION

Practice reveals that there are different situations which make it desirable to position a subterranean curtain below the face of the earth. It may for instance be desirable to restrict movement or migration from particular subject matter, such as pollution or chemicals, from one area to an adjacent area. It may also be desirable to secure that particulate subject matter that is not harmful to the environment remains in place. This specifically applies to sand that is present below dikes.

Without intent to restrict the generality of the instant invention, it is noted that with the anticipated rising sea level in the coming decades there is a need to reinforce existing dikes. One of the problems that deteriorates the reliability of dikes is the so-called piping. Piping is the effect of sand beneath the dike washing away under the influence of the subterranean water pressure buildup caused by the relatively high water level on one side of the dike. When this effect continues uninterruptedly in the end the water coming from one side of the dike reaches the other side of the dike through a channel or pipe below the dike.

A similar problem occurs when there is a need to restrict migration of polluting elements in an area below the face of the earth to other areas adjacent to the polluted area. A costly solution is to remove the soil from the polluted area and replace it by unpolluted soil. Another costly solution that causes unwanted vibrations and forms a nuisance for the environment, is the use of steel sheet piles with watertight slots to isolate the polluted area. If the costs are acceptable, a better solution is to provide a screen between the face of the earth and a deeper down the face of the earth watertight layer so as to isolate the polluted area. The screen can also be placed vertically between two watertight layers below the face of the earth.

According to the invention a method, an apparatus and a curtain are proposed having features according to one or more of the appended claims.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawing, which is incorporated into and forms a part of the specification, illustrates one or more embodiments of the present invention and, together with the description, serves to explain the principles of the invention. The drawing is only for the purpose of illustrating one or more embodiments of the invention and is not to be construed as limiting the invention. In the drawings:

FIG. 1 illustrates an apparatus according to the invention.

DETAILED DESCRIPTION OF THE INVENTION

In an embodiment of the method of the invention, the curtain of the invention is put in place by executing the steps of:
  selecting an area with soil in which the subterranean curtain is to be placed;
  carving a slit at a predefined location in the soil;
  providing a movable casing in said slit;
  providing the movable casing with the curtain;
  dispatching the curtain from the movable casing into the slit;
  closing said slit;
  providing the subterranean curtain as a water-permeable curtain in an area with a predefined stratification of a sand layer and a clay layer on top of said sand layer, using the steps of:
    carving a slit at a predefined location in said area comprising said sand layer and said clay layer; and
    after dispatching the water-permeable curtain from the movable casing into the slit, introducing sand and clay in the slit on opposite sides of the water-permeable curtain so as to close said slit and restore the area's original stratification of sand and clay. This method is particularly suitable for the reinforcement of dikes.

One aspect of the method of the invention is that the subterranean water-permeable curtain is selected as an impermeable curtain for preselected material not being water (such as sand), and that the curtain is provided below the face of the earth to restrict movement of said preselected material, particularly sand, from one side of the curtain to an opposite side of the curtain.

The subterranean curtain can be either a synthetic curtain or a textile curtain. Such a subterranean curtain extends after its placement in part in the sand layer and in part in the clay layer on top of said sand layer near to or below the dike. The curtain is permeable for water but impermeable for sand so that the sturdiness of the construction below the dike is maintained.

A major advantage of the method according to the invention is that the costs that are associated with placement of the curtain are relatively limited. A further benefit is that the curtain can be placed below the Earth's surface without affecting the soil in the immediate vicinity where the slit is provided, which is particularly beneficial for maintaining the integrity of dikes that are reinforced this way, and also when the curtain is used in the direct vicinity of buildings or infrastructural objects like bridges or viaducts.

The invention is also embodied in an apparatus for placement of a subterranean curtain, which after its placement extends below the face of the earth. Such an apparatus comprising an automotive machine part for movement on the face of the earth, comprises carving means arranged to carve a vertically extending subterranean slit extending below the face of the earth, and a casing suspended from the automotive machine part and movable in said slit, and is according to the invention characterized in that the casing is provided with dispatching means for placement of measurement wires on opposite sides of the curtain. These measurement wires, which can also be integral with the curtain, are used after the placement of the curtain is completed for monitoring the status of the surrounding soil, which is desirable with reference to polluted soil but also with reference to the sand layer below a dike that is reinforced with a subterranean curtain provided with the method of the invention.

The measurement wires can be of any suitable design and can be used for any feasible purpose. Suitably however, the measurement wires are embodied as hybrid wires, comprising glass fibers with an electrically conducting core wire. This is advantageous for monitoring the operational state of the sand layer adjacent to a subterranean water permeable curtain, since it enables to repeatedly heat and cool the hybrid wire by feeding and interrupting an electrical current through the electrically conducting core wire, and monitoring the rate of change of temperature of the hybrid wire. This rate of change of temperature is a measure of the waterflow below the dike which also depends on the density of the sand layer. By monitoring this rate of change of temperature of the measurement wires at both sides of the curtain, it is possible to detect differences that indicate variation in the permeability of the curtain.

The method of placing the curtain is preferably performed by dispatching the curtain from the movable casing while said casing is moving through the slit. This provides the advantage that the curtain can be placed uninterruptedly, which is beneficial for the workflow and speed of operation. This is a general advantage which is particularly relevant when the method and apparatus of the invention are used to reinforce one or more dikes with the curtain of the invention. The speed of operation can be further promoted by providing the curtain to the movable casing in a continuous flow. One thing and another is also an important factor for the reliability of the curtain acting in its functionality to prevent unintended migration of particular subject matter, such as the washing away of sand, since due to the uninterrupted placement of the curtain there are also no interruptions in the curtain. When applied to dikes, there is therefore no room for the sand layer to be effected to the detriment of the reliability of the thus reinforced dike.

One of the issues to be able to provide the curtain at an industrial scale under the surface of the earth is solved by providing the curtain to the movable casing in a folded condition. This makes possible that the curtain can be provided smoothly and quickly down to the casing.

Correspondingly the curtain is unfolded while it is dispatched from the movable casing so as to have it extend over a predetermined height in the slit. Accordingly the apparatus of the invention is preferably provided with a channel extending from the automotive machine part to said casing, which channel is arranged to supply the curtain to the casing. It is then also beneficial that the automotive machine part is provided with a storage for the curtain. To enable that the curtain can be effectively transported down through the channel to the casing, the automotive machine part is provided with folding means for the curtain. In connection therewith it is also preferred that the casing is provided with unfolding means for the curtain.

To promote a swift and smooth operation the curtain is preferably provided with guide wires and the movable casing is preferably provided with guide means that cooperate with said guide wires so as to position the curtain vertically within the slit. Accordingly the apparatus of the invention preferably has the feature that the casing is provided with guide means for the curtain, which are preferably equipped to cooperate with guide wires embroidered in or forming part of the curtain.

In another aspect the casing is provided with trailing rubber flaps where during use the curtain is dispatched from the casing. The trailing rubber flaps ensure that despite the high pressure that may prevail in the slit, the intrusion of dirt or sand in the casing which might deteriorate the quality of the curtain is effectively avoided.

According to the method of the invention sand and clay are introduced in the slit on opposite sides of the curtain to restore the areas original stratification of sand and clay. In this connection it is advantageous that the apparatus comprises a trough with an outlet opening into a tube extending into the slit for reintroducing sand into said slit on opposite sides of the curtain.

For an effective transfer of sand down to the slit the tube is preferably provided with vibrating means and/or a screw drive.

The clay is advantageously provided into the slit in the form of swell clay. This provides an effective closure of the top layer, particularly in humid conditions.

The invention is also embodied in a water-permeable curtain which is impermeable for at least one preselected material not being water, and which has guide wires arranged on opposite extremities of the curtain.

It is possible that the guide wires of the curtain are sealed steel wires to avoid corrosion of the steel core that would make the wires eventually unsuitable for being detected by magnetometers and also unsuitable for removal of the curtain by pulling at the wires from the earth's surface. Preferably however the guide wires are from a sufficiently strong plastic material, which plastic material may, depending on the situation, be reinforced for instance with interwoven glass fibers or other reinforcing material. To enable detection of the curtain by magnetometers it is then also preferable to weave a magnetic strip or strips in the curtain. Such magnetic strips have the advantage that they can be easily monitored at larger distances from the curtain. It is advantageous to include a magnetic strip at both sides of the curtain close to the guide wires. Although using plastic guide wires will not allow removal of the curtain by pulling at the wires, this is not disadvantageous since the curtain can then be demolished by having the apparatus of the invention operate repeatedly in the slit where the curtain has been placed during an earlier operation. During the repeated operation of the apparatus in the previously made slit a new curtain can be provided in this slit, or the original stratification of the sand and clay in the slit can be restored.

The invention will hereinafter be further elucidated with reference to the drawing of an exemplary embodiment of an apparatus used in a method according to the invention that is not limiting as to the appended claims. This exemplary embodiment relates to the placement of a curtain in soil below a dike in order to be able to exemplify all the features of the invention. The invention is however explicitly not restricted to such an application but can be applied for placement of a subterranean curtain in any type of soil.

In the drawing FIG. 1 shows an apparatus according to the invention.

FIG. 1 shows an apparatus 1 for placement of a subterranean curtain 2 to extend in part in a sand layer 3 and in part in a clay layer 4 on top of said sand layer 3 yet below the face 5 of the earth. The apparatus comprises an automotive machine part 6 for movement on the face 5 of the earth as well as carving means 7 arranged to carve a vertically extending subterranean slit in said sand layer 3 and said clay layer 4.

The apparatus 1 further comprises a casing 8 suspended from the automotive machine part 6 and movable in said slit made by the carving means 7. FIG. 1 also shows that the apparatus 1 comprises a channel 9 extending from the automotive machine part 6 to said casing 8, which channel 9 is arranged to supply the curtain 2 to the casing 8. For this purpose the automotive machine part 6 is provided with a storage 10 for the curtain 2. The apparatus 1 further includes folding means 11 for the curtain 2. Conversely the casing 8 is provided with unfolding means 12 for the curtain 2, which are preferably embodied as guide means 13 for the curtain 2. Said guide means 13 are equipped to cooperate with guide wires 19 embroidered in or forming part of the curtain 2.

The casing 8 of the apparatus 1 is further provided with trailing rubber flaps 14 at the part of the casing 8 where during use the curtain 2 is dispatched from the casing 8.

The casing 8 is provided with dispatching means for placement of measurement wires 18 on opposite sides of the curtain 2. The way how this can be implemented is clear for the skilled person and is therefore not shown in the FIGURE. FIG. 1 does however show that the apparatus 1 preferably comprises a trough 15 that has an outlet opening into a tube 16 extending into the slit for reintroducing sand into said slit on opposite sides of the curtain 2. The tube 16 is preferably provided with vibrating means and a screw drive 17.

In use the apparatus 1 of the invention is operated to execute the steps of:
    carving a slit using the carving means 7 at a predefined location in an area comprising said sand layer 3 and said clay layer 4;
    providing the movable casing 8 in said slit;
    providing the movable casing 8 with the curtain 2;
    dispatching the curtain 2 from the movable casing 8 into the slit; and finally
    introducing sand and clay in the slit on opposite sides of the curtain 2 so as to close said slit.

The apparatus 1 of the invention makes possible that by displacement of the automotive machine part 6 the curtain 2 can be dispatched from the movable casing 8 while said casing 8 is moving through the slit. Concurrently it is arranged that the curtain 2 is provided in a continuous flow from the automotive machine part 6 to the movable casing 8. For this purpose the curtain 2 in the storage 10 is unwound and folded into a folded condition by the folding means 11 mounted on the automotive machine part 6, whereafter the folded curtain 2 is provided to the movable casing 8. After arrival at the casing 8, the curtain 2 is unfolded while it is being dispatched from the movable casing 8 so as to have it extend over a predetermined height in both the sand layer 3 and the clay layer 4. For this purpose the curtain 2 is provided with guide wires 19 that cooperate with guide means 13 of the movable casing 8 so as to position the curtain 2 vertically within the sand layer 3 and clay layer 4. At the same time measurement wires 18 are dispatched from the movable casing 8 on opposite sides of the curtain 2, which will be later used for monitoring the condition of the curtain.

Preferably the guide wires are from a sufficiently strong plastic material. If required the plastic material may be reinforced for instance with interwoven glass fibers or other reinforcing material. To secure the possibility of detection of the curtain by magnetometers it is then also preferable to weave a magnetic strip or strips in the curtain. This is not further shown in the FIGURE but the way in which this can be implemented is clear for the skilled person. Such magnetic strips have the advantage that they can be easily monitored at larger distances from the curtain up to 3 or 4 m. It is advantageous to include a magnetic strip at both sides of the curtain close to the guide wires.

After placement of the curtain 2, the method continues by introducing sand and clay in the slit on opposite sides of the curtain 2 so as to restore the area's original stratification of sand and clay. Preferably the clay is provided in the form of swell clay which simplifies closing of the slit by an water-impermeable layer.

After placement of a subterranean curtain according to the method of the invention, a measurement method can be applied for monitoring the operational state of the curtain, which in accordance with the invention is provided with at least one measurement wire. The measurement wire can be integral with the curtain. Preferably however there are two adjacent measurement wires on opposite sides of the curtain 2. The measurement wire or wires are preferably embodied as hybrid wire, comprising glass fibers with an electrically conducting core wire. The measurement method is executed by arranging that the hybrid wire is repeatedly heated and cooled by feeding and interrupting an electrical current through the electrically conducting core wire, and the rate of change of temperature of the hybrid wire is monitored to early detect unintended deterioration of the sand layer below the dike.

Although the invention has been discussed in the foregoing with reference to an exemplary embodiment of the apparatus and methods of the invention, the invention is not restricted to this particular embodiment which can be varied in many ways without departing from the gist of the invention. The discussed exemplary embodiment shall therefore not be used to construe the appended claims strictly in accordance therewith. On the contrary the embodiment is merely intended to explain the wording of the appended claims without intent to limit the claims to this exemplary embodiment. The scope of protection of the invention shall therefore be construed in accordance with the appended claims only, wherein a possible ambiguity in the wording of the claims shall be resolved using this exemplary embodiment.

What is claimed is:

1. A method to reinforce a dike by placement of a subterranean water-permeable curtain below the face of the earth, comprising the steps of:
   selecting an area with soil in which the subterranean curtain is to be placed;
   carving a slit at a predefined location in the soil;
   providing a movable casing in said slit;
   providing the movable casing with the curtain;
   dispatching the curtain from the movable casing into the slit; and
   closing said slit, and
   wherein carving the slit and providing the subterranean curtain in said slit is executed in an area with a predefined stratification of a sand layer and a clay layer on top of said sand layer, wherein:
   after dispatching the water-permeable curtain from the movable casing into the slit, sand and clay is introducing in the slit on opposite sides of the water-permeable curtain so as to close said slit and restore the area's original stratification of sand and clay.

2. The method according to claim 1, additionally comprising selecting the subterranean water-permeable curtain as an impermeable curtain for preselected material not being water, and providing the curtain below the face of the earth to restrict movement of said preselected material from one side of the curtain to an opposite side of the curtain.

3. The method according to claim 1, additionally comprising providing the water-permeable curtain with guide wires and providing the movable casing with one or more guides that cooperate with said guide wires so as to position the curtain vertically within the slit.

4. The method according to claim 1, additionally comprising dispatching measurement wires from the movable casing on opposite sides of the curtain simultaneously with the dispatching of the curtain from the movable casing.

5. The method according to claim 4, additionally comprising embodying the measurement wires as hybrid wires, comprising glass fibers with an electrically conducting core wire.

6. The method according to claim 1, additionally comprising providing the clay in the form of swell clay.

* * * * *